United States Patent
Yao

(10) Patent No.: US 8,254,907 B2
(45) Date of Patent: Aug. 28, 2012

(54) METHOD FOR ACTIVATING A TRACE SESSION IN A WIRELESS COMMUNICATION SYSTEM

(75) Inventor: Yi-Zhi Yao, Beijing (CN)

(73) Assignee: Motorola Mobility LLC, Libertyville, IL (US)

( * ) Notice: Subject to any disclaimer, the term of this patent is extended or adjusted under 35 U.S.C. 154(b) by 965 days.

(21) Appl. No.: 12/265,971

(22) Filed: Nov. 6, 2008

(65) Prior Publication Data

US 2010/0113000 A1    May 6, 2010

(51) Int. Cl.
*H04W 24/00*    (2009.01)

(52) U.S. Cl. .................. 455/423; 455/422.1; 455/67.11; 455/414.1

(58) Field of Classification Search ............... 455/414.2, 455/411, 410, 412.1, 412.2, 520, 446, 67.11, 455/414.1, 419, 417, 423, 422.1, 67.13; 717/128; 380/270
See application file for complete search history.

(56) References Cited

U.S. PATENT DOCUMENTS

| | | | |
|---|---|---|---|
| 7,369,988 B1 * | 5/2008 | Thenthiruperai et al. ...... | 704/10 |
| 2007/0226701 A1 * | 9/2007 | Suonvieri et al. ............. | 717/128 |
| 2008/0192770 A1 * | 8/2008 | Burrows et al. ............... | 370/466 |

FOREIGN PATENT DOCUMENTS

WO    WO 02/082729 A1    10/2002

OTHER PUBLICATIONS

3rd Generation Partnership Project, "3GPP TS 32.422 v8.2.0—GSM Global System for Mobile Communications," 3GPP; Technical Specification Group Services and System Aspects; Telecommunication Management; Subscriber and Equipment Trace; Trace Control and Configuration Management (Release 8) Sep. 29, 2008, Cover page and pp. 27, 36 and 49.

Dae Geun Jang, "Corresponding Application PCT/US2009/061992—PCT International Search Report and Written Opinion," WIPO, ISA/KR, Korean Intellectual Property Office, Daejeon, Republic of Korea, May 31, 2010, 11 pages, most relevant pp. 6-7 and 10-11.

* cited by examiner

*Primary Examiner* — John J Lee

(57)    ABSTRACT

A method (200) of activating or deactivating a trace session using an international mobile subscriber identifier in a long term evolution communication networks (100). The method includes receiving a trace session activation or deactivation request with an IMSI identifier by the eNodeB (104) to activate or deactivate a trace session for subscriber and forwarding the trace session activation or deactivation request and IMSI identifier to a wireless communication network entity (108). The trace session activation request including IMSI (204) and trace session activation request (304) can be forwarded over an S1 interface between network entities.

19 Claims, 3 Drawing Sheets

METHOD FOR ACTIVATING A TRACE SESSION IN A WIRELESS COMMUNICATION SYSTEM

FIELD OF THE INVENTION

The present invention relates generally to activating and deactivating a trace session in an wireless communication system and, in particular, to activating and deactivating a subscriber trace from an element manager to an eNodeB in an LTE wireless communication system.

BACKGROUND

In Universal Mobile Telecommunications System (UMTS) wireless communication networks, trace sessions for mobile stations are activating using International Mobile Subscriber Identifiers (IMSI) for the subscribers. In Long Term Evolution (LTE) and 4G wireless telecommunication networks that includes Evolved UMTS Terrestrial Radio Access Network (E-UTRAN), however, the International Mobile Subscriber Identifier (IMSI) is not used in the access stratum signaling messages in E-UTRAN. Because of the differences between UMTS and LTE, the trace session can not be activated directly in E-UTRAN using IMSI information.

One proposal uses an interface between LTE element managers (EM). In particular, the proposal suggests using a long training field in a peer-to-peer interface that is between the element manager of an eNodeB and the element manager of a mobility management entity (MME). This interface and connection are used to forward the IMSI as a part of trace session request to the relevant MME. This solution, however, requires the long training field and the peer-to-peer interface between the relevant element managers, but these are not required by LTE.

It is therefore needed to have a trace session activated in LTE from the EM of E-UTRAN that can use a subscriber's IMSI.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
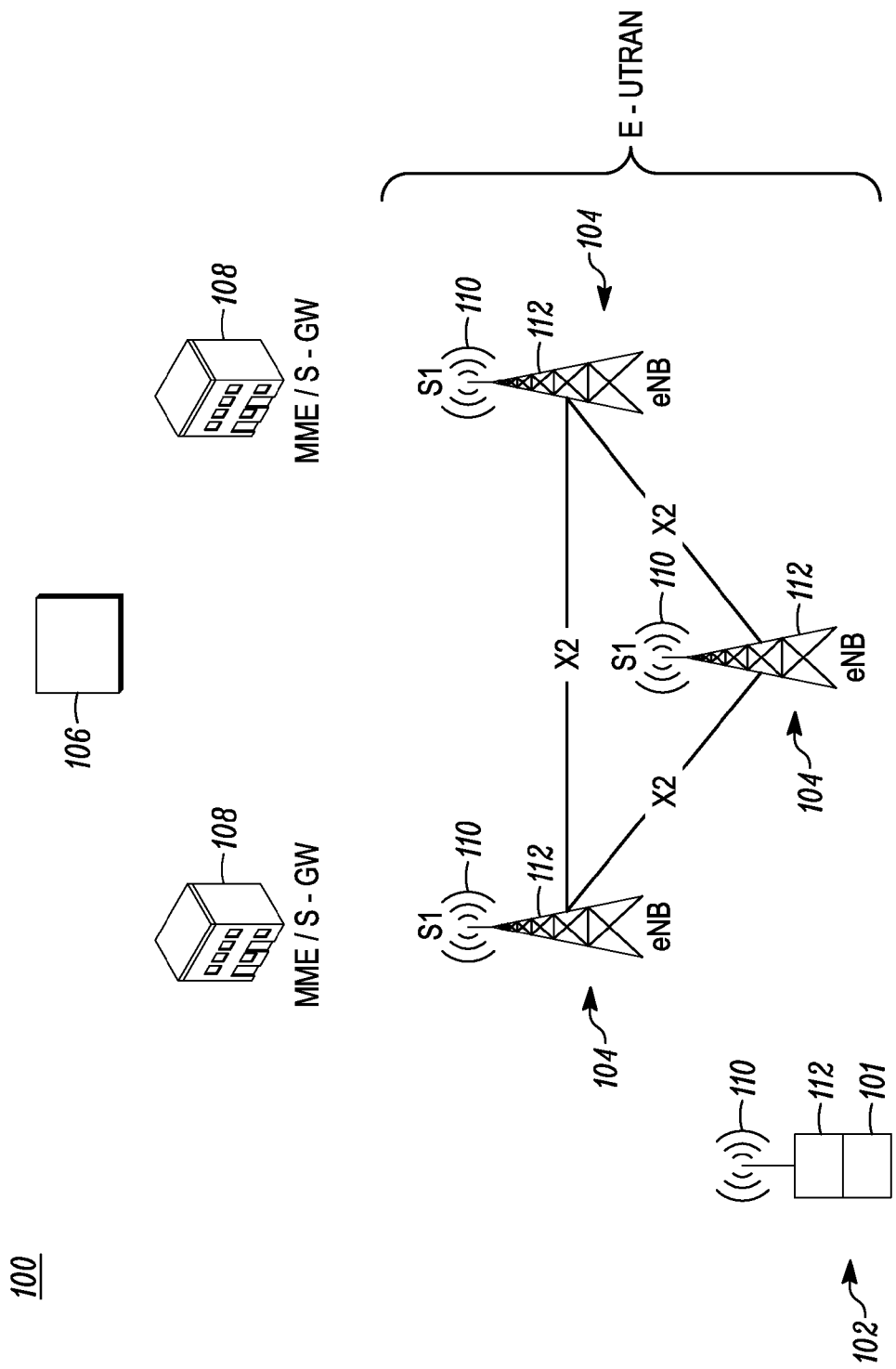
FIG. 1 is an example of wireless communication network elements used in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to the activation and deactivation of a trace session from the EM of E-UTRAN in LTE using an international mobile subscriber identifier (IMSI.) Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of the activation and deactivation of a trace session originated from the EM of E-UTRAN using IMSI in LTE described herein. The non-processor circuits may include, but are not limited to, a radio receiver, a radio transmitter, signal drivers, clock circuits, power source circuits, and user input devices. As such, these functions may be interpreted as steps of a method to perform the activation and deactivation of a trace session originated from the EM of E-UTRAN using IMSI in LTE. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

An embodiment discussed herein is directed to a method for activating a trace session from the EM of E-UTRAN in LTE using an IMSI identifier. The method includes receiving a trace session activation request to active a trace session for a subscriber in a wireless communication network. The method also includes forwarding the trace session activation request with trace control configuration parameters including an identifier of the subscriber to a wireless communication network entity. The trace activation request can be forwarded over an S1 interface between network entities. In this embodiment, the trace activation request is received at an eNodeB of the wireless communication network and the received trace activation request includes the identifier. The identifier can be international mobile subscriber identifier that uniquely identifies the subscriber in the wireless communication network. Moreover, the network entity for LTE is a mobility management entity.

Another embodiment discussed is directed to a method for deactivating a trace session originated from the EM of E-UTRAN using an IMSI identifier in LTE. The method includes receiving a deactivation request by the eNodeB to deactivate a trace session that is being performed for a subscriber in a wireless communication network forwarding the deactivation request with trace configuration parameters including an identifier of the subscriber to a network entity over an S1 interface. In this embodiment, the deactivation request is received by an eNodeB of the wireless communication network and the identifier is an international mobile subscriber identifier that uniquely identifies the subscriber. As described above, the network entity is a mobility management entity within the wireless communication network.

In yet another embodiment, a method is described that receives a trace activation request at a mobility management entity in an LTE wireless communication network wherein the trace activation request includes an identifier of a subscriber for which the trace activation request corresponds and starts the trace session in response to the trace activation request. In addition, the method receives triggering events from an node in the wireless communication network, and activates the trace with the node for the subscriber in response to the received triggering events. The identifier includes an international mobile subscriber identifier for the subscriber. The method can further include receiving a trace session deactivation request at the mobility management entity wherein the trace session deactivation request includes the identifier of the subscriber for which the deactivation request corresponds.

Turning to FIG. 1, a wireless communication network 100 is shown that includes the network elements used in connection with the embodiments described. The network 100 shown is described as an LTE-type network and includes E-UTRAN network although it is understood that the principles and embodiments described can be applied to other types of wireless communication networks in which the IMSI is also not used in the access stratum signaling messages. Network 100 is used by a subscriber whose identifier is residing in user equipment 102, which can be any type of mobile station including dual mode user equipment 102. User equipment 102 access the E-UTRAN network to communicate with other user equipment and other entities through an eNodeB 104 node. The eNodeB 104 nodes function as an access point into the wireless communication network and as a base station to communicate with other network entities or nodes within the network 100. As is understood, the E-UTRAN consists of eNodeBs 104 that are interconnected with each other by given interfaces. The eNodeBs 104 host functions including radio resource management, radio bearer control, radio admission control, connection mobility and dynamic allocation of resources for use by a subscriber via user equipment 102 in both the uplink and downlink. The subscriber is associated with the user equipment 102 using an identifier 101.

The network 100 can also include an element manager 106. The element manager 106 specifies a package of management function for network elements such as eNodeB 104. The element manager can be associated with eNodeB 104 or any combination of other network elements and can provide element management functions and sub-network management functions for the network elements. In addition, the network 100 can include a mobility management entity (MME) 108.

The MME can provide scheduling and transmission of paging messages and broadcast messages that are provided to the eNodeBs 104 or other network elements.

As is understood by one of skill in the art, the user equipment 102 and the eNodeBs 104 include a standard transceiver 110 and processor 112. The transceiver transmits and receives messages and requests sent between the user equipment 102 and the eNodeBs. The user equipment 102 and eNodeBs 104 including their respective transceivers 110 are operated using the processor 112.

Figure 2:
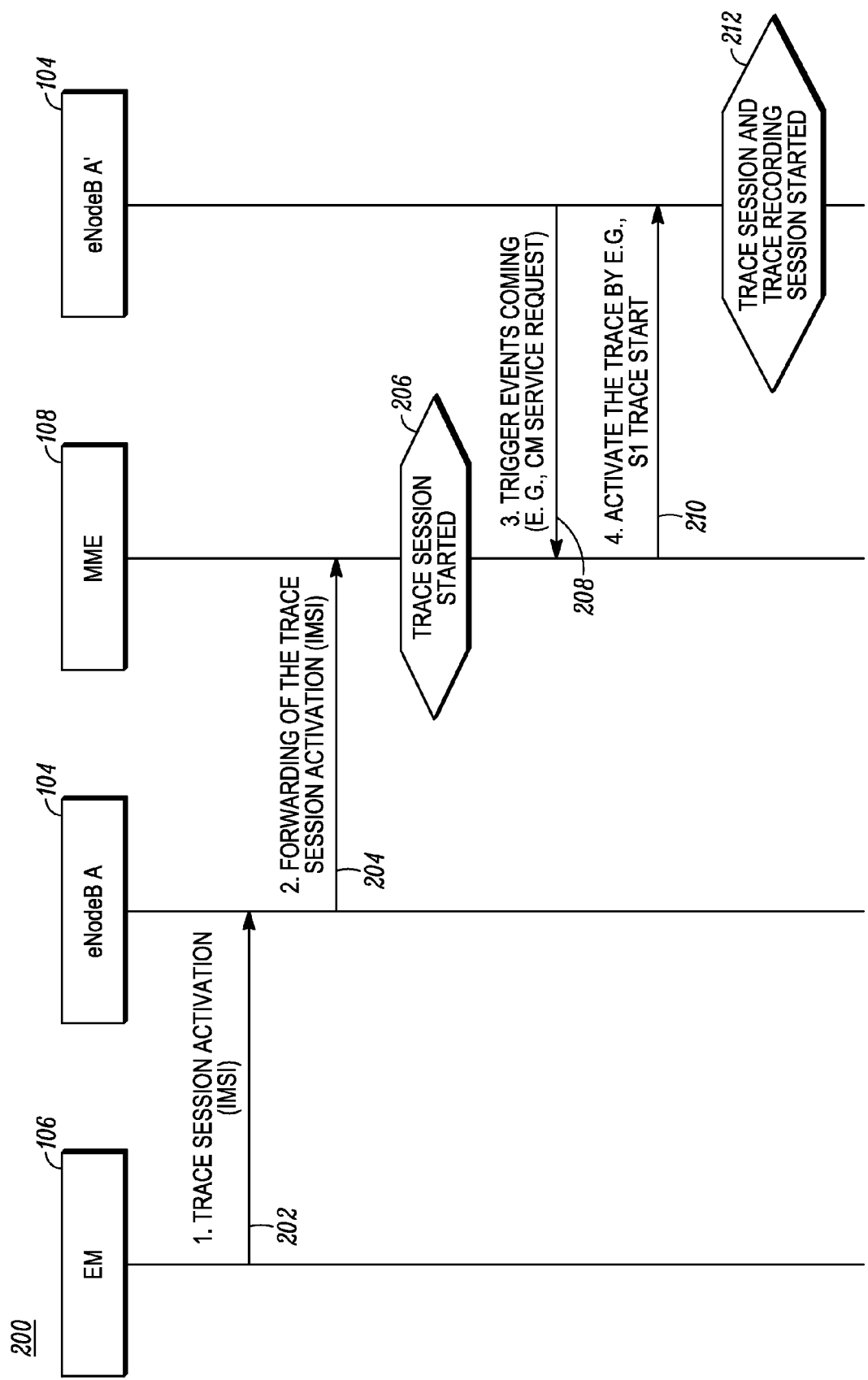
FIG. 2 is a flow chart of a trace session activation in accordance with some embodiments of the present invention.

FIG. 2 illustrates a call flow chart 200 for activating a trace using international mobile subscriber identifications (IMSI) that is originated from the element manger 106 of an E-UTRAN. The IMSI is an identifier 101 for a subscriber and is associated with a user equipment 102. As seen, the element manager 106 activates 202 a trace session using the IMSI of a subscriber identifier 101 to user equipment 102 for which the trace session is needed to an eNodeB 104. The element manager 106 activates the trace session by sending a trace session activation request with the IMSI of the subscriber that is to be traced to the first eNodeB 104. The element manager 106 also sends the trace control and configuration parameters along with the IMSI in the trace session activation request. After receiving the trace session activation request, which includes the IMSI for the subscriber, the first eNodeB 104 forwards 204 the trace session activation request including the trace control and configuration parameters and the IMSI and of the subscriber to the MME 108 that is associated with the first eNodeB 104. The eNodeB 104 forwards the trace session activation request via the S1 interface between the eNodeB and the MME.

The MME 108 starts 206 the trace session for the subscriber associated with the IMSI upon receipt of the activation. The trace session starts as a normal signaling based subscriber trace at the MME 108. As a part of the trace session, the subscriber can initiate an event such as a service request or other messages such as those found in 3GPP TS 32.422 and other sources. When a service request or similar message is received 208 from the eNodeB 104, this event is considered a triggering event as a part of the trace session, the MME 108 sends 210 a message to the eNodeB 104 to activate the trace session associated with the IMSI. In an embodiment the message is an S1 message, e.g., TRACE START message. Upon receipt of the trace activation request, e.g., S1 TRACE START message the eNodeB 104 starts 212 the trace session and trace recording session for the IMSI according to the trace control and configuration parameters. It is understood that another eNodeB within the network 100 can trigger the MME to activate the trace by transferring the triggering events for the subscriber 101.

Figure 3:
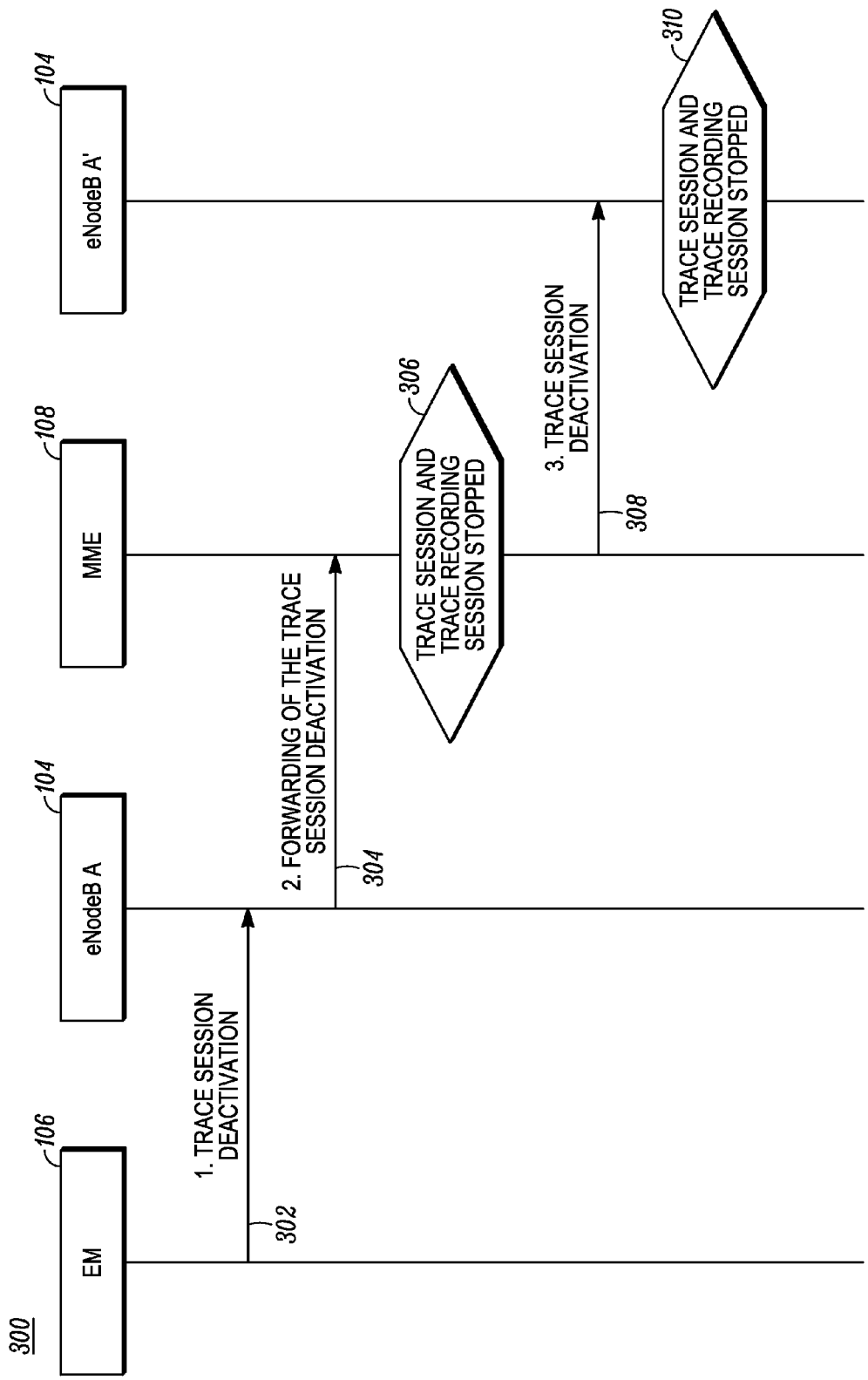
FIG. 3 is a flow chart of a trace session deactivation in accordance with some embodiments of the present invention.

FIG. 3 illustrates a call flow chart 300 for deactivating a trace session using IMSI that is originated from the element manger 106 of an E-UTRAN. As seen, the element manager 106 deactivates 302 a trace session using the IMSI for a subscriber associated with the user equipment 102 by sending a trace session deactivation request with the same IMSI as the activated trace session to the eNodeB 104. After receiving the trace session deactivation request, the first eNodeB 104 forwards 304 the trace session deactivation request together with the IMSI for the subscriber to the MME 108 that is associated with the first eNodeB 104. The MME 108 stops 306 the trace session for the subscriber upon receipt of the deactivation request. As a part of deactivating the trace session, the MME sends 308 trace session deactivation request to the eNodeB 104 to deactivate the trace session associated with the IMSI. Upon receipt of the request the eNodeB 104 stops 310 the trace session and trace recording session for the IMSI. It is understood that another eNodeB within the network 100 can trigger the MME to deactivate the trace by sending the trace session deactivation request.

As described, the activation and deactivation of the trace session originated from the EM of E-UTRAN using the IMSI in LTE enables the EM of the eNodeB to start and stop a trace session for any given subscriber using the IMSI. By the eNodeB forwarding the activation/deactivation requests with the IMSI, the described method enables trace session activation/deactivation to be based on S1 signaling between the eNodeBs and MME, which provides for more reliable and efficient network operations because the required S1 network connections are established.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method comprising:
receiving, by an Evolved Node B (eNodeB), a trace activation request to activate a trace session associated with a subscriber in a wireless communication network, wherein the trace activation request is initiated by an element manager in the wireless communication network, and
forwarding, by the Evolved Node B (eNodeB), the trace activation request with trace control configuration parameters including an identifier for the subscriber to a wireless communication network entity.

2. The method of claim 1 trace activation request is received at the eNodeB of the wireless communication network.

3. The method of claim 1 wherein the identifier is an international mobile subscriber identifier that uniquely identifies the subscriber in the wireless communication network.

4. The method of claim 1 wherein the network entity is a mobility management entity.

5. The method of claim 1 wherein the received trace activation request includes the identifier.

6. The method of claim 1 further comprising receiving a deactivation request to deactivate the trace session activated by the network entity wherein the deactivation request includes the identifier.

7. The method of claim 6 further comprising forwarding the deactivation request to deactivate the trace session with identifier to the network entity.

8. The method of claim 1 wherein the trace activation request with the identifier is forwarded over an S1 interface, wherein the S1 interface is an interface between the eNodeB and the wireless communication network entity.

9. A method comprising:
receiving, by an Evolved Node B (eNodeB), a deactivation request to deactivate a trace session that is being performed for a subscriber in a wireless communication network, wherein the deactivation request is initiated by an element manager in the wireless communication network, and
forwarding, by the Evolved Node B (eNodeB), the deactivation request with trace configuration parameters including an identifier for the subscriber to a network entity in the wireless communication network.

10. The method of claim 9 wherein the deactivation request is received by the eNodeB of the wireless communication network.

11. The method of claim 9 wherein the identifier is an international mobile subscriber identifier that uniquely identifies the subscriber.

12. The method of claim 9 wherein the network entity is a mobility management entity within the wireless communication network.

13. The method of claim 9 wherein a trace activation request has been received before the deactivation request is received and wherein the trace activation request includes the identifier.

14. The method of claim 9 wherein the deactivation request with the identifier is forwarded over an S1 interface, wherein the S1 interface is an interface between the eNodeB and the network entity.

15. A method comprising:
receiving a trace activation request at a mobility management entity in a wireless communication network wherein the trace activation request includes an identifier for a subscriber for which the trace activation request corresponds, wherein the trace activation request is initiated by an element manager in the wireless communication network;
starting the trace session at the mobility management entity in response to the trace activation request;
starting the trace recording session at the mobility management entity when receiving triggering events from an eNodeB in the wireless communication network, and
activating the trace session and trace record session at the mobility management entity with the eNodeB for the subscriber in response to the received triggering events.

16. The method of claim 15 wherein the identifier includes a international mobile subscriber identifier for the subscriber.

17. The method of claim 15 further comprising receiving a trace session deactivation message at the mobility management entity wherein the trace session deactivation message includes the identifier of the subscriber for which the deactivation message corresponds.

18. The method of claim 17 further comprising deactivating the trace session with the eNodeB with which the trace is activated.

19. The method of claim 15 wherein the trace activation request is received over an S1 interface, wherein the S1 interface is an interface between the eNodeB and the mobility management entity.

* * * * *